United States Patent [19]
Takasaka

[11] Patent Number: 5,806,559
[45] Date of Patent: Sep. 15, 1998

[54] METHOD AND APPARATUS FOR INDICATING OPEN/CLOSED CONDITIONS OF A VALVE AS WELL AS A VALVE HAVING THE APPARATUS

[75] Inventor: Tsutomu Takasaka, Shinagawa-ku, Japan

[73] Assignee: Ihara High Pressure Fittings Co., Ltd., Tokyo, Japan

[21] Appl. No.: 591,797

[22] Filed: Jan. 25, 1996

[30] Foreign Application Priority Data

May 12, 1995  [JP]  Japan .................................. 7-114647

[51] Int. Cl.⁶ .................................................. F16K 37/00
[52] U.S. Cl. ............................................. 137/556; 137/553
[58] Field of Search ...................................... 137/556, 553

[56] References Cited

U.S. PATENT DOCUMENTS

| | | | |
|---|---|---|---|
| 4,674,531 | 6/1987 | Aalto et al. ............................. | 137/556 |
| 5,137,052 | 8/1992 | Baumcart ................................ | 137/556 |
| 5,178,187 | 1/1993 | Raymond, Jr. et al. ................. | 137/556 |
| 5,535,698 | 7/1996 | Trevisan ................................. | 137/556 |

*Primary Examiner*—A. Michael Chambers
*Attorney, Agent, or Firm*—Kanesaka & Takeuchi

[57] ABSTRACT

A valve open/closed condition indication apparatus includes a handle base mounted at an upper portion of a bonnet of a valve and having a spiral guide formed on an upper face thereof, and a handle including a handle body disposed on the handle base and an open/closed condition indication plate disposed on the handle body and engaged with and slidably movable in a diametrical direction by the spiral guide of the handle base. When the handle is rotated, a projection of the open/closed condition indication plate of the handle is guided by the spiral guide formed on the handle base so that it is moved in a diametrical direction. When the valve is put into a fully open condition or a fully closed condition by the rotation of the handle, a symbol or color indication marked on the open/close condition indication plate or the handle body and representing the fully open condition or the fully closed condition is indicated accurately in an indication window formed in a name plate or some other suitable member.

3 Claims, 3 Drawing Sheets

METHOD AND APPARATUS FOR INDICATING OPEN/CLOSED CONDITIONS OF A VALVE AS WELL AS A VALVE HAVING THE APPARATUS

BACKGROUND OF THE INVENTION

1. Field of the Invention

This invention relates to a manually operable valve having an apparatus for indicating a fully open condition and a fully closed condition of the valve.

2. Description of the Related Art

In recent years, dangerous fluids such as, for example, poisonous gases, inflammable gases, combustible gases, explosive gases which exhibit a sensitive mixing action, high purity gases and radioactive fluids have been and are used widely in various industrial fields. Equipments which handle those dangerous fluids likely suffer from a serious accident affecting lives of people arising from an operation of a valve in error. Therefore, as one of countermeasures for safety, a valve for use with any of such dangerous fluids as mentioned above is obliged to indicate an open condition and a closed condition of the valve. The indication of an open or closed condition of a valve indicates a fully closed condition or a fully open condition of the valve, but does not indicate an opening or closing direction of the valve by means of an arrow mark or a like mark.

As far as a valve which is opened or closed by less than one rotation of a handle is concerned, indications of a fully open condition and a fully closed condition of the valve can be presented above or around the handle comparatively readily. However, where the valve is of the type which is opened or closed by more than one rotation of a handle, condition indications are difficult comparing with the former valve.

Meanwhile, to a valve of the type wherein a stem moves upwardly and downwardly, a valve opening and closing condition indication apparatus is applied wherein an upward or downward movement of the stem is detected by means of a screw or a takeoff bar to indicate an open or closed condition of the valve by means of a pointer scale indicator or an upward or downward movement of the stem is detected by means of a pair of limit switches to indicate an open or closed condition of the valve. However, the opening and closing condition indication apparatus which employs a pointer scale indicator is disadvantageous in convenience in use in that graduations cannot be visually observed readily. On the other hand, the opening and closing condition indication apparatus which employs limit switches cannot be applied to a valve of a small bore diameter in terms of the mounting space. Further, since the opening and closing condition indication apparatus just described makes use of electricity, where it is applied to a valve for a fluid which is liable to explode, it must be constructed as an explosion-proof apparatus.

One of known valve open/closed condition indication apparatus which can be applied to a valve whose stem does not move upwardly or downwardly is shown in FIGS. 1a and 1b.

Referring to FIGS. 1a and 1b, cylindrical member 22 having open/closed condition indication plate 22a at an upper portion thereof is fitted and mounted for rotation on bonnet 21. Open/closed condition indication plate 22a is an arcuate plate provided on an outer periphery over one fourth the circumference of the top of cylindrical member 22 and having the words of "OPEN" and "CLOSED" marked on a surface thereof as seen in FIG. 2.

Handle 24 is mounted at an upper portion of stem 23 and has a pair of indication windows 24a and 24b formed therein to allow the words of "OPEN" and "CLOSED" marked on open/closed condition indication plate 22a to be visually observed from the outside, respectively. Pin 24c for engaging with open/closed condition indication plate 22a is provided on a lower surface of handle 24.

In the valve having the open/closed condition indication apparatus described above, if handle 24 is rotated in its valve opening direction, pin 24c provided on handle 24 is first engaged with open/closed condition indication plate 22a and, in this condition, cylindrical member 22 is thereafter rotated while the word of "OPEN" is indicated in indication window 24a of handle 24. On the contrary, if handle 24 is rotated in its valve closing direction, cylindrical member 22 is rotated while the word of "CLOSED" is indicated in indication window 24b of handle 24. It is to be noted that, where the valve is of the type wherein stem 23 moves upwardly and downwardly, pin 24c must have a sufficient length so that, even if stem 23 moves upwardly, pin 24c may not be disengaged from open/closed condition indication plate 22a. However, with the open/closed condition indication apparatus described above, the word of "OPEN" or "CLOSED" is indicated in indication window 24a or 24b at an opening degree of the valve at which open/closed condition indication plate 22a is engaged by pin 24c provided on handle 24. Accordingly, the open/closed condition indication apparatus merely indicates a position proximate to a fully open or closed position, but does not necessarily indicate a fully open or closed position. The manner of indication just described is liable to give rise to a serious accident where such a dangerous fluid as mentioned hereinabove is handled. In particular, when an operator closes the valve, if the operator judges, when the word of "CLOSED" is indicated, that the valve body has been closed fully and does not turn handle 24 fully to the closed position, then the dangerous liquid will flow through the valve and may possibly cause a serious accident.

SUMMARY OF THE INVENTION

It is an object of the present invention to provide a manually operable valve which can prevent an opening or closing operation thereof in error.

It is another object of the present invention to provide a method and an apparatus for indicating open/closed conditions of a valve by which a fully open condition and a fully closed condition of the valve can be indicated irrespective of the number of rotations of a handle of the valve and irrespective of upward or downward movement of a stem of the valve.

In order to attain the objects described above, according to an aspect of the present invention, there is provided a method of indicating open and closed conditions of a valve, characterized in that an open/close condition indication plate mounted for sliding movement in a diametrical direction of a handle is engaged with a spiral guide formed on an upper face of a handle base mounted on a bonnet so that the open condition or the closed condition of the valve is indicated by a movement of the open/close condition indication plate by rotation of the handle.

According to another aspect of the present invention, there is provided an apparatus for indicating open and closed conditions of a valve, characterized in that it comprises a handle base mounted at an upper portion of a bonnet of the valve and having a spiral guide formed on an upper face thereof, and a handle provided at an upper portion of the handle base for rotating a stem of the valve, and that the handle includes a handle body disposed on the handle base, and an open/close condition indication plate disposed on the handle body and engageable with and slidably movable in a diametrical direction by the spiral guide of the handle base.

According to a further aspect of the present invention, there is provided an apparatus for indicating open and closed conditions of a valve, characterized in that it comprises a handle base mounted at an upper portion of a bonnet of the valve and having a spiral guide formed on an upper face thereof, and a handle provided at an upper portion of the handle base for rotating a stem of the valve, and that the handle includes a handle body having a concave portion formed in a diametrical direction on an upper face thereof and having a hole perforated at an end portion of the concave portion, an open/close indication plate disposed for sliding movement on the concave portion of the handle body and having a projection formed to extend downwardly at an end portion thereof, and a name plate disposed on an upper face of the handle body and having an indication window formed therein adjacent an outer periphery thereof, and that an end of the projection of the open/close condition indication plate extends through the hole perforated in the handle body and is engaged with the spiral guide formed on the handle base.

According to a still further aspect of the present invention, there is provided a valve, characterized in that it comprises the open/closed condition indication apparatus described above.

The above and other objects, features, and advantages of the present invention will become apparent from the following description based on the accompanying drawings which illustrate an example of a preferred embodiment of the present invention.

BRIEF DESCRIPTION OF THE DRAWINGS

The invention will be more particularly described with reference to the accompanying drawings, in which:

FIG. 1b is a sectional view taken along line I—I of FIG. 1a;

FIG. 4b is a sectional view taken along line IV—IV of FIG. 4a;

FIG. 5b is a sectional view taken along line V—V of FIG. 5a;

FIG. 6b is a side view of the open/closed condition indication plate of FIG. 6a.

DETAILED DESCRIPTION OF THE PREFERRED EMBODIMENT

Figure 1A:
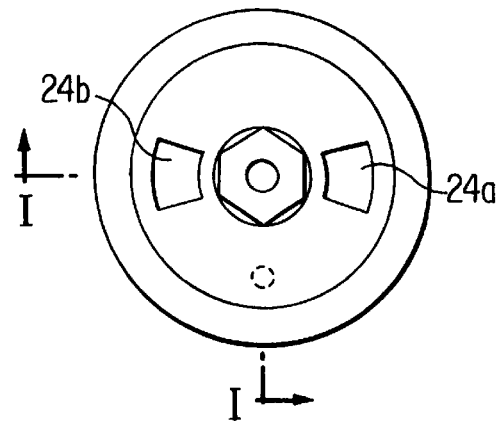
FIG. 1a is a plan view showing a conventional open/closed condition indication apparatus for a valve.
Figure 1B:
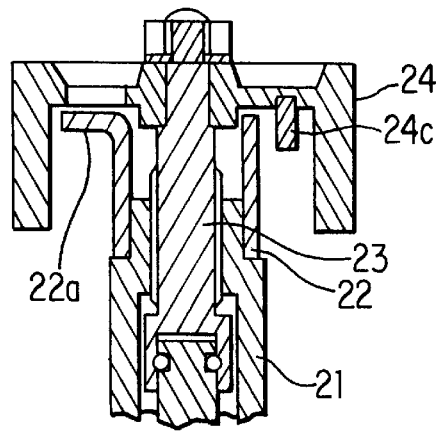
Figure 2:
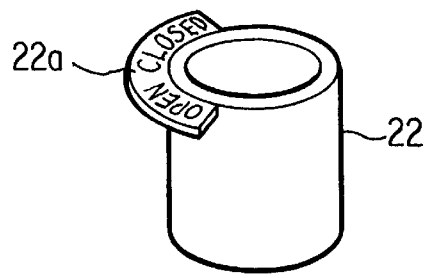
FIG. 2 is a perspective view showing a cylindrical member of the valve shown in FIG. 1b.
Figure 3:
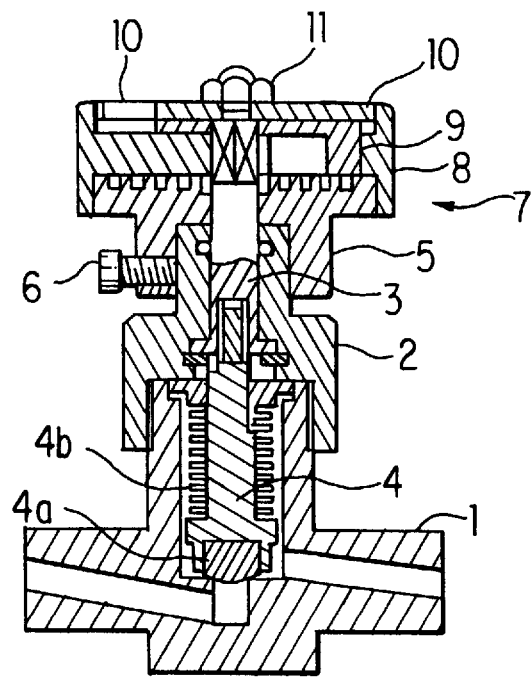
FIG. 3 is a vertical sectional view showing a valve of an embodiment of the present invention.

An embodiment of the present invention is described below with reference to the drawings. FIG. 3 is a vertical sectional view showing a bellows valve.

Denoted at reference numeral 1 is a valve body having inlet and outlet openings for fluid, and bonnet 2 is screwed to an upper portion of valve body 1. Stem 3 is fitted for rotation in an inner bore of bonnet 2. A female thread is formed on an inner face of a lower portion of stem 3, and disk 4 having seal 4a at a lower portion thereof is screwed for upward and downward movement in the female thread of stem 3. Bellows 4b is disposed on an outer periphery of disk 4.

Figure 4A:
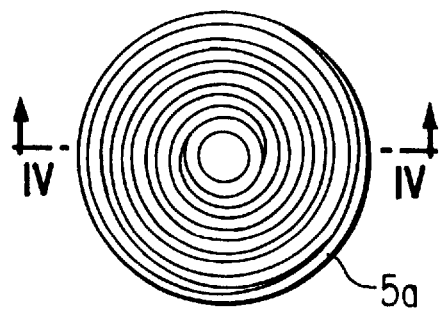
FIG. 4a is a plan view showing a handle base.
Figure 4B:
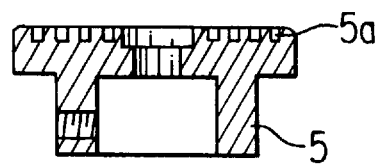

Handle base 5 is located at an upper portion of bonnet 2 and secured to bonnet 2 by means of fastening screw 6. Such spiral groove 5a serving as a spiral guide as shown in FIGS. 4a and 4b is formed on an upper surface of handle base 5. Handle body 8 of handle 7 is disposed for rotation on the upper face of handle base 5.

Figure 5A:
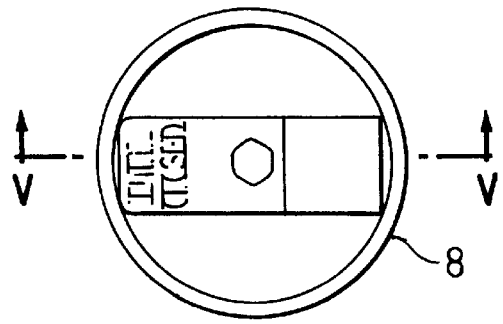
FIG. 5a is a plan view showing a handle body.
Figure 5B:
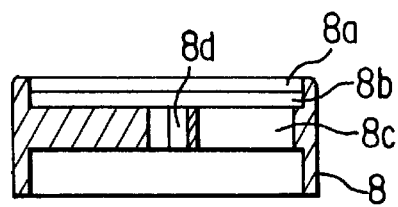
Figure 6A:
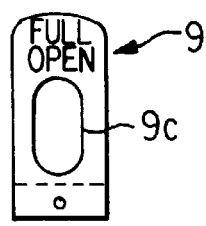
FIG. 6a is a plan view showing an open/closed condition indication plate.
Figure 6B:
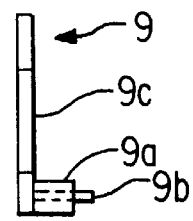

Such circular concave portion 8a as shown in FIGS. 5a and 5b is formed on an upper face of handle body 8, and another rectangular concave portion 8b is provided in a diametrical direction of circular concave portion 8a. Substantially square hole 8c is formed at an end portion of concave portion 8b while hexagonal hole 8d for engaging with stem 3 is opened at a central portion of concave portion 8b. Rectangular open/closed condition indication plate 9 is disposed for sliding movement on rectangular concave portion 8b of handle body 8. Open/closed condition indication plate 9 has projection 9a formed to extend downwardly at an end portion thereof as seen in FIGS. 6a and 6b.

Projection 9a is inserted for movement in substantially square hole 8c perforated in handle body 8, and needle-like bar 9b provided at an end of projection 9a is inserted in spiral groove 5a described hereinabove. Elongated hole 9c is formed at a substantially central portion of open/closed condition indication plate 9, and stem 3 extends through elongated hole 9c.

Figure 7:
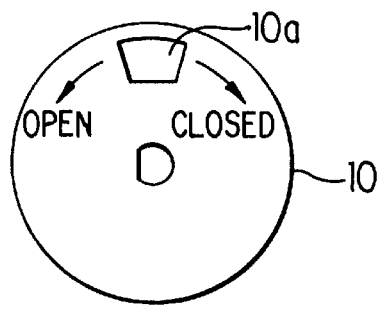
FIG. 7 is a plan view showing a name plate.

Such circular name plate 10 as shown in FIG. 7 is provided for engagement with handle body 8 in circular concave portion 8a provided on the upper face of handle body 8, and indication window 10a is formed in name plate 10 adjacent an outer periphery of name plate 10. Further, an opening direction and/or a closing direction are marked on name plate 10 in accordance with the necessity. Handle 7 formed from handle body 8, open/closed condition indication plate 9 and name plate 10 is mounted for rotation on handle base 5 by means of nut 11 screwed at the top of stem 3. It is to be noted that handle 7 having the construction described above is integrally rotated with stem 3.

Operation of the embodiment described above is described below.

Open/closed condition indication plate 9 is set so that, in a fully closed condition of the valve wherein the seat of valve body 1 is closed fully with seal 4a and it is confirmed that fluid is blocked airtight, projection 9a on open/closed condition indication plate 9 is positioned on the right side as seen in FIG. 3. Name plate 10 is adjusted in position such that, when projection 9a is positioned as described above, the symbol or color indication marked on the surface of handle body 8 and representing the fully closed condition of the valve can be visually observed accurately through indication window 10a formed in name plate 10. The symbol or color indication indicating the fully closed condition is provided by the terminology of "FULL CLOSED" or by a green color on the left side in FIG. 5a of rectangular concave portion 8b of handle body 8 as seen, for example, in FIG. 5a.

Then, if handle 7 is rotated counterclockwise to open the valve, then stem 3 is rotated to move up disk 4 which has seal 4a at a lower portion thereof. Further, needle-like bar 9b provided at a lower portion of projection 9a of open/closed condition indication plate 9 is guided by spiral groove 5a formed on handle base 5 so that it is moved toward the center of handle base 5. Then, when the fully open condition of the valve is reached, the symbol or color indication marked on the upper surface of open/closed condition indication plate 9 is indicated accurately in indication window 10a formed in name plate 10. The symbol or color indication representing the fully open condition is provided by the terminology of "FULL OPEN" or by a red color on the surface of open/closed condition indication plate 9 remote from projection 9a.

In summary, if handle 7 is rotated in the valve closing direction until the valve is put into its fully closed condition, then the terminology of "FULL CLOSED" or the green color is indicated over the entire area in indication window 10a of name plate 10. On the contrary, if handle 7 is rotated in the valve opening direction until the valve is put into its fully open condition, the terminology of "FULL OPEN" or the red color is displayed over the entire area in indication window 10a of name plate 10.

Since the open/closed condition indication method and apparatus for a valve is constructed in such a manner as described above, even if the handle is rotated more than one rotation, the fully open condition or the fully closed condition can still be indicated. Further, since the fully open condition or the fully closed condition is indicated only when the valve is in the fully open condition or the fully closed condition, an opening or closing operation of the valve in error by an operator can be eliminated, and consequently, an otherwise possible accident can be prevented. It is to be noted that a degree of an open or closed condition can be visually observed through indication window 10a depending upon an additional symbol or color indication marked on the upper surface of handle body 8 or open/closed condition indication plate 9.

The spiral shape of spiral groove 5a serving as a spiral guide described hereinabove in connection with the embodiment may be any of various shapes including those having fixed pitches and those having varying pitches. Further, spiral groove 5a may be replaced by a spiral projection formed on handle base 5 and engaged with an end of projection 9a of open/closed condition indication plate which is formed otherwise in an inverted concave shape. It is to be noted that, while also the spiral projection may have any of various shapes, preferably the spiral projection is formed in the form of a male thread while the end of projection 9a is formed in the form of a female thread. Further, the end of projection 9a may have an inverted concave shape and receive therein a spherical element which is engaged with spiral groove 5a.

Further, while, in the embodiment described above, hexagonal hole 8d is formed at the central portion of handle body 8 and engaged with stem 3, the hole need not be a hexagonal hole but may alternatively be a quadrangular hole. Or, the hole may be formed as a circular hole. In this instance, an upper portion of stem 3 may be cut into a crescent shape while handle body 8 is fitted on the upper portion of stem 3 and secured to stem 3 by means of a fastening screw located on a side face of handle body 8.

While the open/close condition indication method and apparatus for a valve in the embodiment described above is applied to a bellows valve of the type wherein stem 3 does not move upwardly by rotation of handle 7, it can be applied to a bellows valve of a different type wherein stem 3 moves upwardly. In this instance, it is necessary to form spiral groove 5a of handle base 5 with an increased depth and form open/closed condition indication plate 9 for engaging with spiral groove 5a with an increased length.

Further, the open/close condition indication method and apparatus of the present embodiment can be applied also to other valves than bellows valves.

As many apparently widely different embodiments of this invention may be made without departing from the spirit and scope thereof, it is to be understood that the invention is not limited to the specific embodiment thereof except as defined in the appended claims.

What is claimed is:

1. An apparatus for indicating open and closed conditions of a valve, which comprises:

a handle base mounted at an upper portion of a bonnet of said valve and having a spiral guide formed on an upper face thereof, and a handle provided at an upper portion of said handle base for rotating a stem of said valve, said handle comprising:

a handle body disposed on said handle base for rotation, and an open/close condition indication plate disposed on and rotatable with said handle body and engageable with and slidably movable in a diametrical direction by said spiral guide of said handle base which is secured to said valve bonnet and does not rotate with said handle body.

2. An apparatus for indicating open and closed conditions of a valve, which comprises:

a handle base mounted at an upper portion of a bonnet of said valve and having a spiral guide formed on an upper face thereof, and a handle provided at an upper portion of said handle base for rotating a stem of said valve, said handle comprising:

a handle body disposed on said handle base and having a concave portion formed in a diametrical direction on an upper face thereof and having a hole perforated at an end portion of said concave portion, an open/close indication plate disposed for sliding movement on said concave portion of said handle body and having a projection formed to extend downwardly at an end portion thereof, and a name plate disposed on an upper face of said handle body and having an indication window formed therein adjacent an outer periphery thereof, wherein an end of said projection of said open/close condition indication plate extends through said hole perforated in said handle body and is engaged with and moved in a diametrical direction by said spiral guide formed on said handle base.

3. A valve, characterized in that it comprises the open/closed condition indication apparatus as set forth in claim 1 or 2.

* * * * *